United States Patent [19]

Planeta

[11] Patent Number: 4,826,414

[45] Date of Patent: May 2, 1989

[54] AIR RINGS FOR PRODUCTION OF BLOWN PLASTIC FILM

[76] Inventor: Mirek Planeta, 228 McCraney Street, West, Oakville, Ontario, Canada, L6H 1H7

[21] Appl. No.: 234,775

[22] Filed: Aug. 22, 1988

[51] Int. Cl.$^4$ ............................................. B29C 47/88
[52] U.S. Cl. .................................. 425/72.1; 264/565; 264/568; 425/326.1; 425/388
[58] Field of Search ................. 425/72.1, 326.1, 387.1, 425/325, 388; 264/563–566, 568, 569

[56] References Cited

U.S. PATENT DOCUMENTS

| 4,139,338 | 2/1979 | Cole | 264/565 X |
| 4,259,047 | 3/1981 | Cole | 425/387.1 X |
| 4,473,527 | 9/1984 | Fujisaki et al. | 264/569 X |
| 4,478,564 | 10/1984 | Shinmoto | 425/72.1 |
| 4,717,323 | 1/1988 | Karl et al. | 425/326.1 X |
| 4,750,874 | 6/1988 | Keim | 425/72.1 |

FOREIGN PATENT DOCUMENTS 59-89123  5/1984  Japan .................. 425/72.1

OTHER PUBLICATIONS

"Blown Films's A Cinch with New Air Ring", *Plastics Technology*, Sep. 1988.

*Primary Examiner*—Richard L. Chiesa
*Attorney, Agent, or Firm*—Rogers & Scott

[57] ABSTRACT

The invention provides a new air ring of single or dual orifice type for use as a primary or secondary ring to cool a blown extruded tube of molten plastic material, and also to stabilize the moving tube. The air from the ring is kept in contact with the tube outer surface as much as possible by a ring "chimney" surrounding the tube. Maximum cooling requires maximum air velocity and in prior art apparatus this may cause generation of vibrations of the bubble, resulting in non-uniform film, or even disruption of the bubble. The air volume and velocity must therefore be resricted to ensure that this does not happen. In the new air rings the side wall of the chimney diverges outwards in the direction of bubble movement to form a chamber, an end wall closing the downstream end of the chamber turning suddenly radially inwards toward the bubble to form a short narrow orifice. This chamber side wall is spaced from the tube outer wall along its entire length a minimum distance substantially greater than the outlet orifice, preferably from 2 to 20 times greater. The chamber has at least one aperture, preferably a plurality of circumferentially spaced apertures, whihc permit ambient air to bleed into the chamber and reduce the vacuum to a safe value. The apertures preferably are of controllable flow to permit adjustment of the vacuum force. The air velocity and vacuum are now effectively independent of one another and can be adjusted separately. Different structures to accommodate bubbles of a range of blow-up ratios are provided.

16 Claims, 5 Drawing Sheets

AIR RINGS FOR PRODUCTION OF BLOWN PLASTIC FILM

BACKGROUND OF THE INVENTION

The present invention is concerned with improvements in or relating to air rings of the type that are employed in apparatus for the production of blown plastic film by extruding a tube thereof, and then expanding the tube by internal air pressure to a larger diameter, the ring being disposed around the tube of molten material in order to cool it.

REVIEW OF THE PRIOR ART

It is now virtually standard practice in apparatus for the production of blown plastic film to provide an air ring immediately adjacent to the outlet of the die from which the extruded tube of molten plastic emerges, the ring delivering an annular stream of cooling air against the outside surface of the tube. At this point the plastic material is hottest and therefore this is the most fragile part of the tube, and this factor severely limits the velocity and quantity of the air that can be discharged by the ring against the tube. Such a ring is designated the "primary" ring, and it is increasingly common to provide one or more "secondary" rings downstream of the primary ring to increase the cooling, especially with materials in which a high "stalk" is needed for the bubble to obtain adequate solidification, so that the speed of movement of the tube can be increased in order to increase production.

Rapid cooling of the tube is important to achieve the highest possible production, but must be secondary to maintaining a smoothly-moving tube that is as stable as possible, and does not wobble or oscillate in its path to the gathering station at which it is flattened and rolled, since such instability results in non-uniformity of the tube wall thickness and of the resultant film, and can be sufficient to disrupt the bubble, so that the apparatus must be stopped and re-started, with consequent loss of production. It will be understood therefore that it is the total production rate of acceptable film that is of importance for profitable operation, and a high instantaneous rate is not effective if too much of the film produced must be scrapped because of defects caused by oscillation, and/or the process is subject to frequent stoppages because of disruption of the tube.

One type of such cooling ring that has been used hitherto, particularily as a primary ring, is known as a dual-orifice, venturi-type ring, as disclosed for example in prior U.S. Pat. No. 4,139,338, issued Feb. 13, 1979, the disclosure of which is incorporated by this reference. These rings have a first smaller annular orifice that discharges a corresponding first minor upstream airstream, and a second larger annular orifice that discharges a second major downstream airstream. The second stream is directed radially outward from the tube, creating a venturi effect that urges the tube outwards towards the ring, thereby stabilising it and permitting an increase in the amount and velocity of the air in the second stream, with consequent increase in cooling. The first stream provides some initial cooling but, more importantly, in passing between the tube and the adjacent ring structure, maintains an annular film of air between the ring structure and the tube that facilitates the smooth passage of the tube through the ring, and ensures that it cannot contact the ring structure and become disrupted. Typically such air rings consist of a lower lip member, an intermediate deflector member, and an upper lip member, the first airstream outlet being between the lower lip and deflector members, and the second airstream outlet being between the deflector and upper lip members. The deflector member is relatively short in height, usually of the order of 2.5 to 5 cm (1 to 2 in.) and its surface facing the tube wall increases progressively in diameter in the direction of movement of the tube.

Because of the short height of the deflector member the air emerging from the ring escapes relatively quickly away from the surface of the moving tube, and in order to increase the cooling effect of the second air stream it is common to provide a "chimney" surrounding the tube to form a narrow annular passage through which the air from both streams passes, so that it is constrained to stay close to the tube surface. The chimney often terminates in an iris at or just beyond the point at which the tube has expanded, the radially inner edge of the iris extending close to the exterior surface of the tube to form an annular gap of predetermined width at what is called the pinch point. The iris can be of fixed diameter if the system is always used with the same or sufficiently similar materials, but otherwise it may be necessary to make it variable in diameter so as to achieve a gap of the necessary dimension. The provision of this narrow passage and narrower exit gap at the pinch point means that the velocity of the air passing through them is increased, and this is accompanied by a corresponding considerable increase in the vacuum force within the passage and at the pinch point pulling the film radially outwards. The chimney is made as high as possible to increase the cooling effect, which can also be increased by increasing the volume of air, which will also result in an increase in the air velocity, again accompanied by an increase in vacuum.

Such systems have an inherent tendency to be unstable since, as the long annular gap between the chimney and the tube becomes narrower, the force of the vacuum pulling the tube radially outwards becomes stronger; at the same time as the gap narrows the same volume of air must pass through the narrowed gap and the resultant radially inwardly acting force of the more compressed air increases and opposes the force of the vaccuum; unless care is taken the balance between the two forces shifts continuously with resultant oscillation. There is therefore a practical upper limit to the velocity employed because in practice an increase beyond this limit makes the bubble sufficiently unstable that it vibrates and wobbles, and this may become sufficiently strong to disrupt it.

Figure 3:
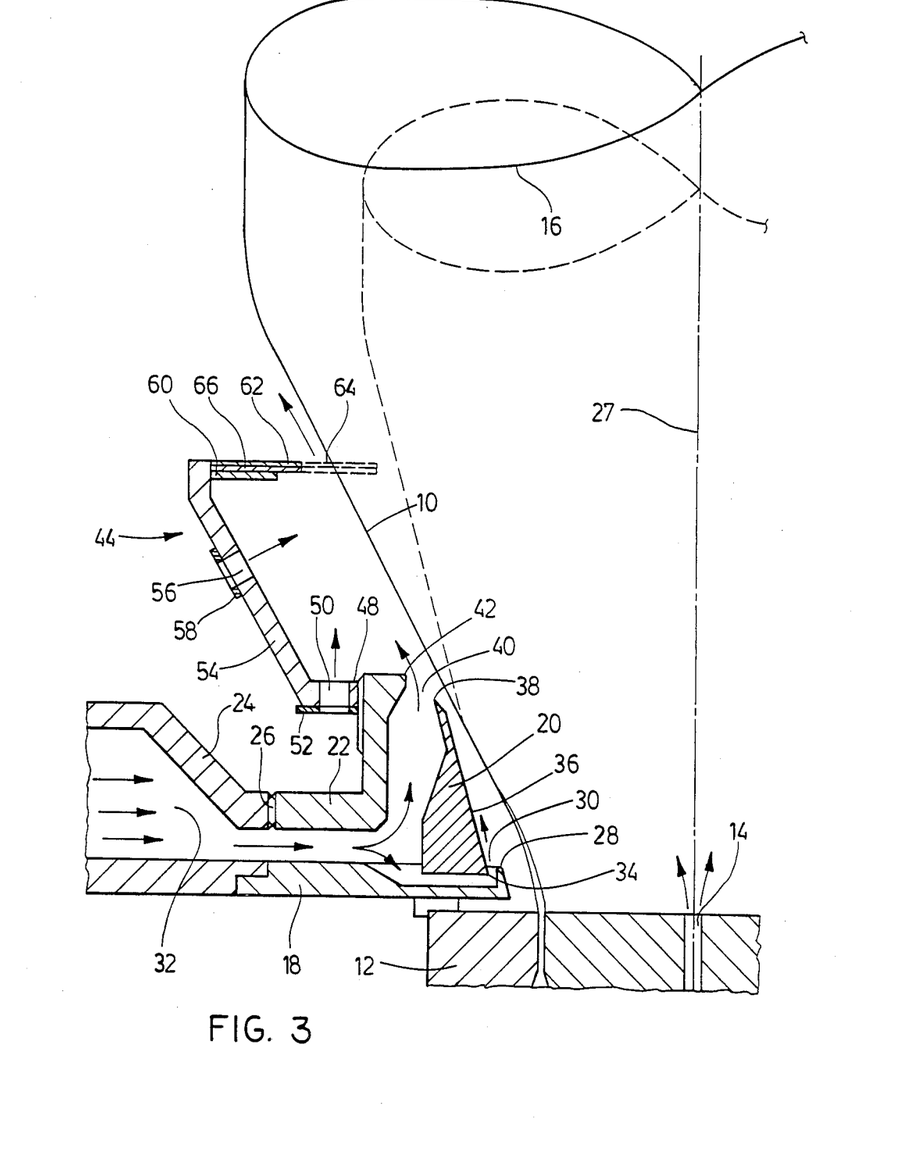
FIG. 3 illustrates a single-chamber, dual-orifice ring in which the end wall portion of the vacuum chamber forming member is constituted by an adjustable iris.

A dual orifice ring with a chimney of about the same height as that of the ring itself is disclosed in FIG. 3 of Japanese Laid-Open Specification No. 59-89123 in the name of Idemitsu Petrochemical K.K. The ring has first and second annular cooling air blowing slits 7 and 8 respectively discharging into the chimney interior, the chimney being formed by a flat horizontal annular wall and a vertical tubular wall 31 of constant diameter extending from the outermost circular edge of the horizontal wall. The wall 31 is provided around its circumference with a plurality of apertures 32 whose purpose is to supply additional cooling air, presumably by extrainment of ambient air by the vaccuum produced within the chimney interior.

DEFINITION OF THE INVENTION

It is therefore a principal object of the invention to provide a new air ring for supplying cooling air to an extruded tube of plastics material, which provides the possibility of relatively high velocity for the cooling air and resultant increased cooling and production.

In accordance with the present invention there is provided a new air ring for the supply of cooling air to the exterior surface of an extruded tube of molten plastics material as it moves in a corresponding path of movement having a longitudinal axis, the ring comprising:

an annular bottom member, and an annular top member, each having an opening therein of circular cross-section concentric with the tube path axis for the passage therethrough of the extruded tube moving in the said path;

the bottom member providing the radially inner lip of an orifice discharging an annular stream of air against the tube outer surface and in the same direction as that of the tube movement, and the top member providing the radially outer lip of the said orifice; and a vacuum chamber forming member connected with and extending beyond the top member and forming a vacuum chamber surrounding the respective portion of the tube beyond the top member, the chamber forming member having a radially outwardly diverging tubular side wall portion extending in the direction of tube movement spaced a minimum predetermined distance along its entire length from the tube surface, and an end wall portion extending transverse to the direction of the tube movement, the end wall portion having a radially inner edge of relatively small dimension in the direction of tube movement and adapted to be disposed adjacent the outer surface of the tube to form an annular gap between the said radially inner edge and tube outer surface of radial dimension smaller than the said predetermined distance, whereby a vacuum is produced in the vacuum chamber urging the wall of the tube radially outward as the result of cooling air exiting through the said annular gap;

the chamber forming member having at least one opening in a wall thereof through which air enters the vacuum chamber to reduce the vacuum therein and thereby reduce the said vacumm force exerted on the tube.

DESCRIPTION OF THE DRAWINGS

Air rings which are particular preferred embodiments of the invention will now be described, by way of example, with reference to the accompanying diagrammatic drawings, all of which are longitudinal cross-sections through the respective rings, wherein.

The same references are used in all the Figures of the drawings whenever that is possible.

DESCRIPTION OF THE PREFERRED EMBODIMENT

Figure 1:
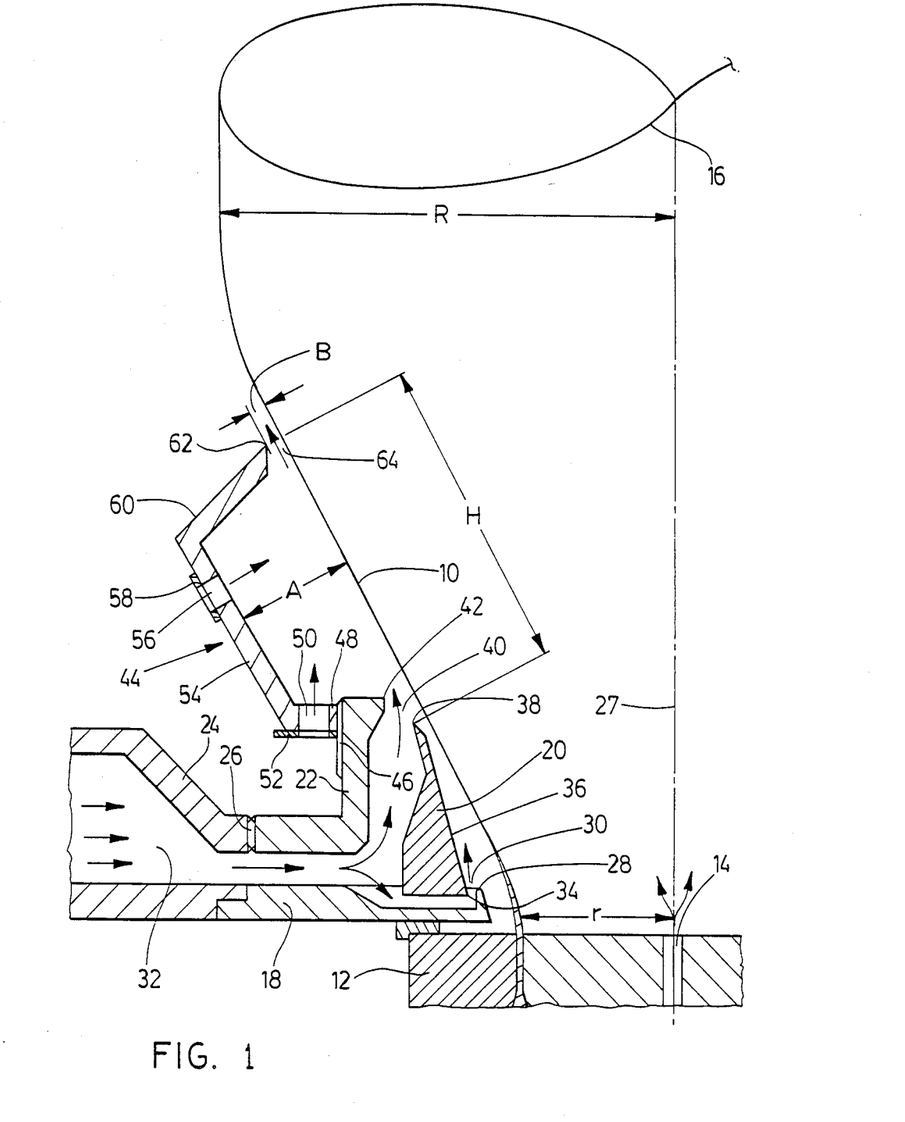
FIG. 1 illustrates a single-chamber, dual-orifice ring with an external air supply.

A tube 10 of molten plastics material issues from a die 12 and passes upwards to sizing, collapsing and gathering apparatus of any suitable type, not shown herein. In known manner air under pressure is supplied to the interior of the tube via an inlet such as a pipe 14. As long as the material is relatively molten the tube stays at its smaller radius r at which it was extruded from the die; as the material begins to solidify it also expands until at or about the frost line 16 it is at its maximum radius R, the ratio R/r being referred to as the blow-up ratio. FIG. 1 illustrates a typical shape for the bubble. A dual-orifice air ring of the invention consists of a bottom lip member 18, an intermediate deflector member 20, and a top lip member 22; in this embodiment the top lip member is mounted on a support member 24 by a screw-thread connection at 26 to permit a small amount of vertical adjustment relative to the top lip member. All of these members are of annular form and are provided with respective central openings through which the tube moves, the openings being of circular cross-section coaxial with longitudinal axis 27 of the die, this axis being coincident with that of the extruded tube 10, and therefore also coincident with that of the path of movement of the tube.

The lower lip member 18 is mounted to be as close as possible to the upper horizontal surface of the die 12 and forms at 28 the radially inner lip of a first smaller annular orifice 30 that is supplied with air from an annular plenum chamber 32. The means by which air under pressure is supplied to the plenum chamber 32 will be apparent to those skilled in this art, and do not need illustration herein. The upstream portion of the deflector member 20 (the lower end as seen in the figures) extends close to the lower member 18 to provide at 34 the radially outer lip of the orifice 30. The inner surface 36 of the deflector member tapers outwards uniformly and progressively downstream, and the air from the orifice 30 moves between the tube and deflector surface 34 in the form of a thin annular stream to ensure that the bubble cannot touch that surface and become damaged or disrupted.

The downstream portion of the deflector member 20 provides at 38 the radially-inner lip of a second larger orifice 40, also supplied with air from plenum 32, while the adjacent portion of the upper member 22 provides at 42 the radially outer lip of this second orifice, which is formed between two facing surfaces of the two members and is shaped so that the emerging annular air stream is directed substantially parallel to the tube wall, so that a venturi effect occurs at the orifice 40, producing a vacuum at this point that urges this portion of the tube 14 to move outwards towards the surface 36 of the deflector member 20. As described above, contact with the deflector member is prevented by the interposed first air stream, and this portion of the tube is therefore effectively locked firmly in position relative to the deflector member.

A chamber-forming member, indicated generally by the reference 44, is mounted on the upper member 22 and is screw-threaded thereto at 46 to permit its vertical adjustment relative thereto. In this embodiment this member has a short lower wall portion 48 extending transversely of the tube axis 28 and provided with a plurality of uniformly, circumferentially spaced apertures 50 (only one shown), each provided with a slidable cover 52 by which its flow capacity can be controlled. This short lower wall portion is connected to a much longer tubular side wall portion 54 which tapers or diverges progressively radially-outwardly and also extends in the direction of tube movement. In this embodiment this wall portion is also provided with a plurality of uniformly circumferentially spaced aperture 56 (only one shown), each also provided with a slidable flow-controlling cover 58. The wall of the member 44 is completed by an upper end wall portion 60, which extends both radially inwards towards the tube wall transversely of the longitudinal axis 28 and in the direction of tube movement, the circular free edge 42 of this wall portion 60 being spaced from the tube outer surface to provide an annular orifice 62 of relatively much smaller radial dimension B, through which the air from the two orifices 30 and 40 escapes to the ambient atmosphere, establishing its own venturi effect as it escapes beyond the orifice 62 and thereby producing a vacuum within the chamber formed between the tube and the member 44. The size of the gap 64 can be adjusted within narrow limits for fine adjustment of the system by moving the member 44 axially on the screw threads 46.

As so far described, with the apertures 50 and 56 completely closed, the end wall portion 60 also functions as an iris of corresponding diameter, and it is found that if the velocity of the air is increased too much, then the possible maximum value depending upon factors such as the melt strength, the vacuum that is generated in the chamber can become so strong that the bubble becomes unstable and is observed to begin to vibrate at the gap 64. In the air rings of the prior art the velocity must immediately be reduced until the vibration stops, since uneven film is being produced, and the bubble may even break. In an air ring of the invention, upon observation of such vibration one or more of the orifices 50 and 56 is opened to bleed a predetermined amount of ambient air into the chamber, thereby reducing the vacuum therein to a safer lower value, without reducing substantially the velocity of the air and its cooling effect. It is now found surprisingly that it is possible to increase the air flow from the second orifice even further, correspondingly increasing the air velocity and its cooling effect, without corresponding increases in the vacuum force in the chamber above the unacceptable level. In practice these two parameters can now be adjusted independently of one another. The air flow from the first orifice may or may not also be increased, since the primary purpose of this air flow is to prevent contact of the bubble with the deflector under the urging of the vacuum force. A skilled operator can observe the bubble as it emerges from the ring and detect by eye whether or not it is beginning to oscillate and adjust the air flow through the aperture so that this is just prevented, so as to obtain the maximum output from the die. The observation of the bubble can be facilitated by making the wall portion 54 of a suitable transparent material, such as transparent methyl methacrylate resin.

The replacement of a prior art dual-orifice air ring with an air ring of the invention is found to permit a very substantial increase in the volume and velocity of the cooling air with a corresponding increase in output of film from the extruder system; increases in output of about 30% are readily obtainable. An experimental test was carried out on a 15 cm (6 in) die employing a 60 cm (24 in) bubble and producing film 2 mils thick; the resin was a blend of low density polyethylene (LDPE) and linear low density polyethylene (LLPDE); the air volume was increased about 20%-30% and it proved possible to increase the speed of the extruder from 70 rpm to 130 rpm., corresponding to an increase in output of 86%. Although in this embodiment both of the wall portions 48 and 54 are provided with a plurality of circumferentially disposed apertures, in other embodiments only one set of apertures may be provided. If the system is one which is used only for one type of polymer it may be possible to operate with apertures of fixed flow capacity.

It is essential for implementation of the invention that the distance A (FIG. 1) between the radially inner surface of the wall portion 54 and the outer surface of the bubble does not decrease below a predetermined minimum value over the entire length of the wall portion and, in view of the progressive radial expansion of the bubble, the wall must diverge or taper radially outward in the direction of movement of the tube in order to maintain this minimum dimension. At the downstream end of the wall portion 54, the end wall portion turns abruptly to suddenly extend towards the bubble and form the short narrow gap 64 of dimension B. Thus, although a vacuum is formed, there is a substantial space for the passage of the large volumes of air, and the vacuum is controlled to an appropriate level, without the close dependence upon one another characteristic of the prior art apparatus. A strong vacuum force is still present at the orifice 64 and locks the bubble in place, but since the gap is of relatively short dimension in the direction of tube movement, the possibility of bubble vibration and instability is correspondingly reduced. It is possible for the divergence of the inner surface of wall portion 54 to be progressively greater than that of the bubble, so that the minimum value of A is exceeded more and more in the direction of tube movement; however there are practical limitations in that the vacuum chamber forming member may then extend out radially so far as to interfere with other parts of the ring, or prevent necessary access for example to the aperture covers 52 and 58. Again it is possible for the wall and its surface to diverge initially to provide a distance A that is much greater than the minimum value and then not diverge any further, perhaps becoming cylindrical and coaxial with the tube, or even to taper or converge somewhat radially inward, provided that along the entire length of the wall surface the distance A is not smaller than the said predetermined minimum value. With a small ring, for use for example with a die of only 15 cm (6 in) diameter, the minimum dimension of A will be about 2.5 cm (1 in), while with the larger rings it can be as much as about 10.0 cm (4 in). Theoretically it is desirable to make A as large as possible, and to increase it as the size f the ring increases, but there are practical limitations because of the resulting size and cost of the resulting air ring, especially if a high blow-up ratio is required.

Another advantage of the air rings of the invention is that the bubble is stabilized by being held by the controlled relatively "low-level" vacuum established in the chamber over a substantial length between the orifice 40 and the gap 64, while the stabilization by the much stronger vacuum at the gap 64 is particularly effective because the melt is cooler, and consequently the bubble wall stronger, so that it is able to withstand the short length stronger vacuum. The distance A must of course be greater than the gap B in order to form the necessary vacuum chamber, and the minimum value for A is about 2B, while the preferred range is from about 4B to about 20B. The chamber also forms a chimney whose effective height H is the distance between the radially inner lip 38 and edge 62 of the gap 64, and in practice this should be as high as possible, so that the controlled stabilizing vacuum extends over as much of the length of the tube as possible. Besides the cost and size factors referred to above a practical limitation is also set, especially with dies and air rings of small diameters, in that the operator must be able conveniently to reach down into the air ring during start up to gather and raise the initial extruded blob of plastic material, in order to establish the bubble and start the line running, and also to clean the orifice lips from time to time, and these operations become too difficult if the structure is too high. As the distance H increases it is desirable also that the value of A should increase, as with the diameter of the ring and with the same practical limitations applying to the final choice of these dimensions.

Although the invention has been described in association with a dual-orifice air ring, since this type is preferred in the industry, it is also applicable to single orifice air rings having the single orifice formed between an upper member and a lower member which provide the respective orifice lips.

Figure 2:
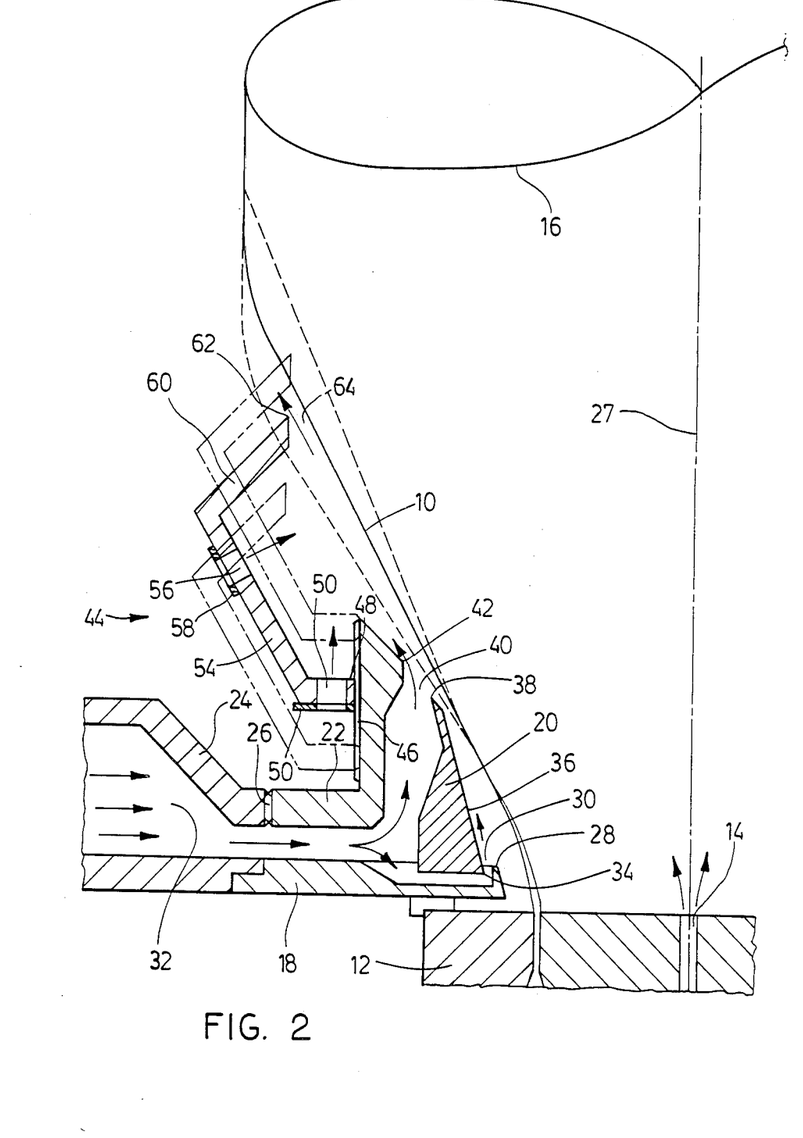
FIG. 2 illustrates a single-chamber, dual-orifice ring, also with an external air supply and with increased adjustability to accommodate a wider range of blow-up ratios.

FIG. 2 shows an embodiment of the invention in which the screw-threaded portion 46 on the upper member 22 is of much greater length, in order to provide for greater adjustment as the system is used with different melt materials. Thus, the member 44 in the middle position shown in solid lines cooperates with a bubble of shape also shown in solid lines, while in the lower position shown in broken lines it cooperates with the outer bubble shape shown in broken lines; similarly while in the upper position shown in broken lines it cooperates with the inner bubble shape shown in broken lines.

FIG. 3 shows another way in which the air ring of the invention can be constructed to accommodate bubbles of different blow-up ratios. The upper wall portion 60 has mounted thereon an adjustable iris structure 66 which also suddenly extends towards the bubble wall and whose variable-diameter radially inner edge constitutes the gap edge 62. This iris is mounted on the wall portion 60 so as to be at 90° to the axis 27, the leaves of the iris then being flat and readily movable to adjust the size of the central aperture so as to maintain the gap 64 at the required size. Thus, as illustrated the iris is adjustable from the diameter shown in solid lines to the diameter shown in broken lines so as to accommodate to the bubble shapes respectively in solid and broken lines.

Figure 4:
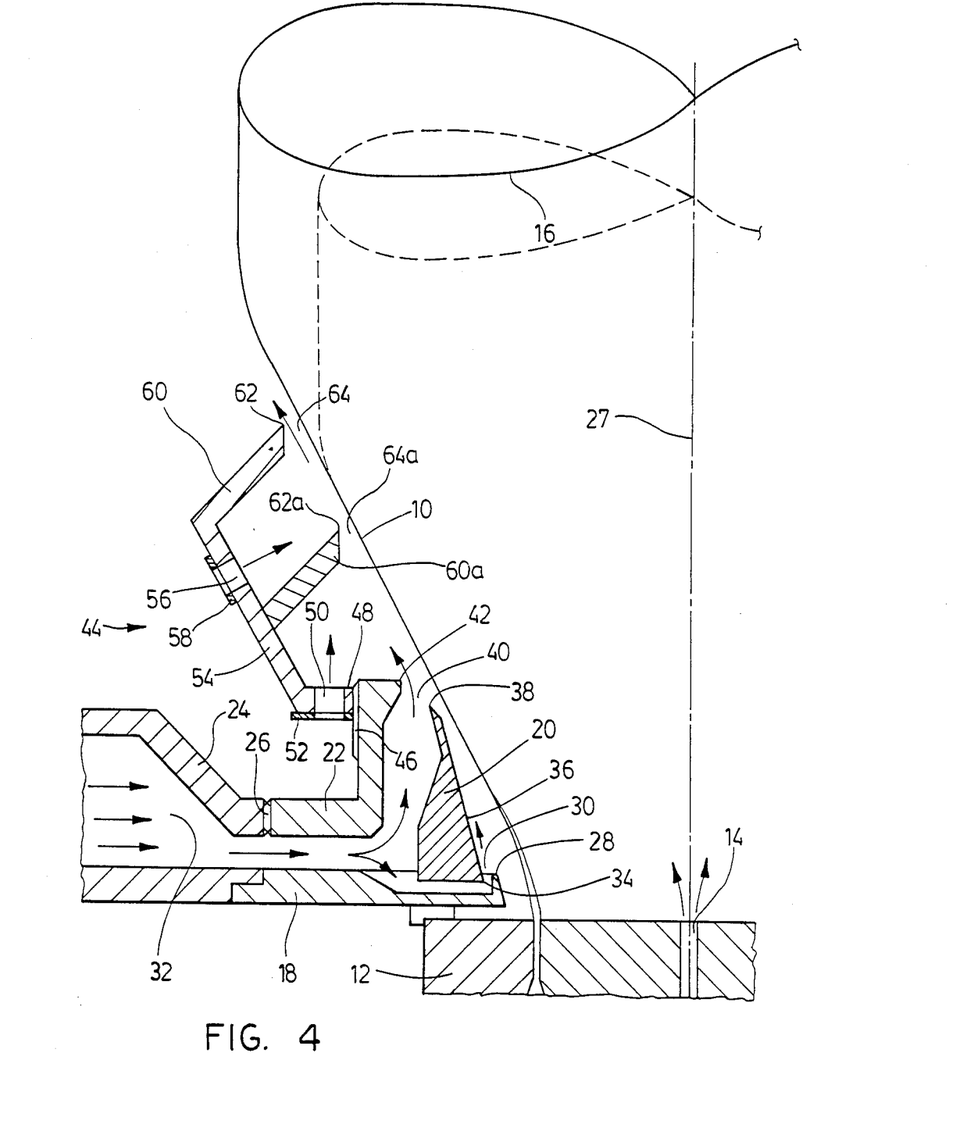
FIG. 4 illustrates a multi-chamber, dual-orifice ring also with an external air supply.

The embodiment of FIG. 4 is a structure suitable for systems with which the blow-up ratio is variable in steps. The chamber forming member 44 is provided with an intermediate "end" wall portion 60a suddenly extending toward the tube wall and having an inner edge 62a to provide a respective gap 64a. With a bubble of smaller blow-up ratio this intermediate wall portion edge 62a is sufficiently close to the tube to provide an effective gap 64a, and it is only the apertures 50 that are operative to reduce the vacuum in the manner of the invention in the chamber between the wall portions 48 and 54 and end wall 60a. If the blow-up ratio is increased sufficiently the end wall portion 60 is also involved and both the apertures 50 and 56 are effective. It will be apparent that a plurality of similar intermediate end wall portions can be provided disposed between the first end wall portion 60 and the connection of the member 44 with the top member 22.

Figure 5:
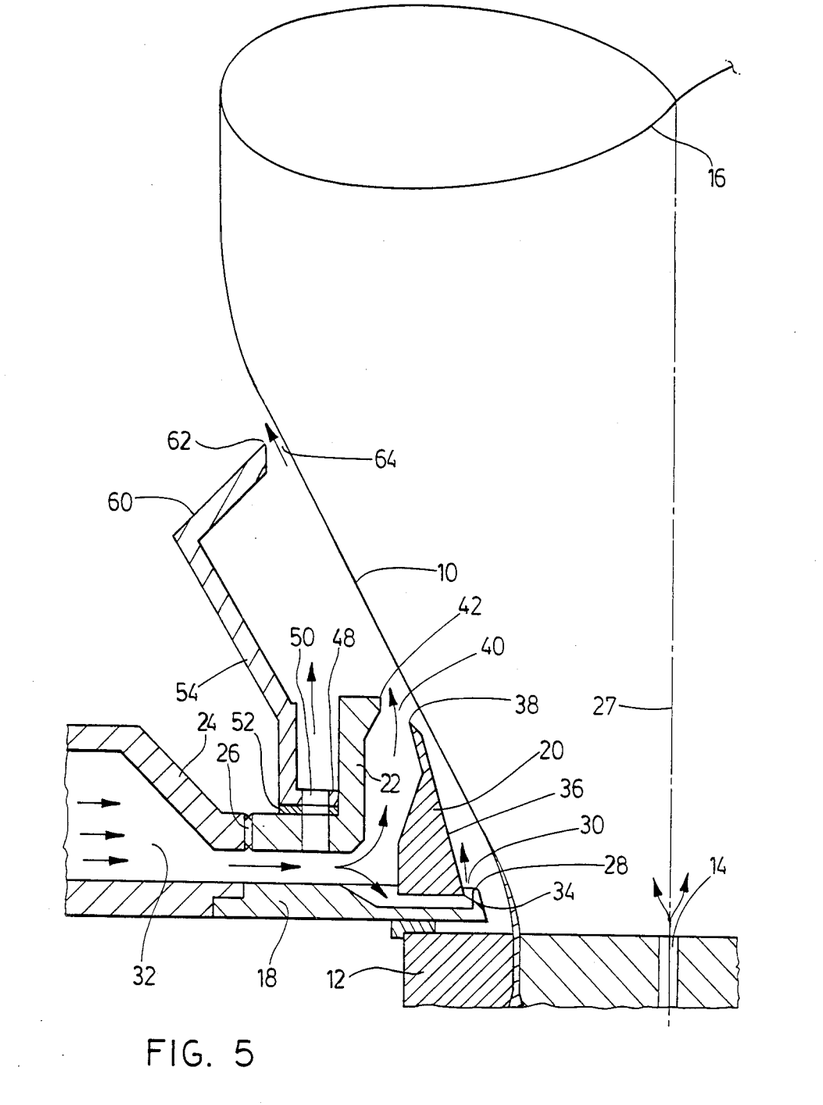
FIG. 5 illustrates a single-chamber, dual-orifice ring with an internal air supply.

FIG. 5 shows an embodiment that is employed when the air supply from the plenum 32 is re-chilled to increase its cooling effect. A substantial part of the cooling would be lost if the vacuum in the chamber were reduced by admission of warm ambient air, and instead the vacuum reducing air is also chilled, being obtained from the plenum 32 by connecting it to the chamber via the apertures 50, the apertures 56 being omitted.

Although in all of the embodiments described two sets of apertures 50 and 56 are provided it will be apparent that in some embodiments only a single set may be provided. Moreover, although the invention has been described in relation to a primary air ring disposed immediately adjacent to the extrusion die 12, it will be apparent that the invention is also applicable to secondary rings spaced along the path of the tube.

I claim:

1. An air ring for the supply of cooling air to the exterior surface of an extruded tube of molten plastics material as it moves in a corresponding path of movement having a longitudinal axis, the ring comprising:
    an annular bottom member, and an annular top member, each having an opening therein of circular cross-section concentric with the tube path axis for the passage therethrough of the extruded rube moving in the said path;
    the bottom member providing the radially inner lip of an orifice discharging an annular stream of air against the tube outer surface and in the same direction as that of the tube movement, and the top member providing the radially outer lip of a second orifice; and
    a vacuum chamber forming member connected with and extending beyond the top member and forming a vacuum chamber surrounding the respective portion of the tube beyond the top member, the chamber forming member having a radially outwardly diverging tubular side wall portion extending in the direction of tube movement spaced a minimum predetermined distance along its entire length from the tube surface, and an end wall portion extending transverse to the direction of the tube movement, the end wall portion having a radially inner edge of relatively small dimension in the direction of tube movement and adapted to be disposed adjacent the outer surface of the tube to form an annular gap between the said radially inner edge and rube outer surface of radial dimension smaller than the said predetermined distance, whereby a vacuum is produced in the vacuum chamber urging the wall of the tube radially outward as the result of cooling air exiting through the said annular gap;
    the chamber forming member having at least one opening in a wall thereof through which air enters the vacuum chamber to reduce the vacuum therein and thereby reduce the said vacumm force exerted on the tube.

2. An air ring as claimed in claim 1, wherein the said outwardly diverging tubular side wall portion of the chamber forming member is spaced radially the said minimum distance from the tube outer wall which is between two and twenty times the radial dimension of the said annular gap.

3. An air ring as claimed in claim 1, wherein the vacuum chamber forming member is mounted on the top member for movement parallel to the said longitudinal axis for adjustment of the radial dimension of the said annular gap.

4. An air ring as claimed in claim 1, wherein the vacuum chamber forming member has a first set of a plurality of circumferentially-shaped apertures in the said side wall portion, and a second set of a plurality of circumferentially-spaced apertures in a lower wall portion between the said side wall portion and the top member.

5. An air ring as claimed in claim 1, wherein each of the said at least one opening in the vacuum chamber forming member side wall is provided with means for adjusting the air flow therethrough for adjustment of the vacuum force in the chamber.

6. An air ring as claimed in claim 1, wherein the said end wall portion comprises an iris having an opening of adjustable diameter, the radially inner edge of the iris opening forming the said annular gap with the tube outer surface.

7. An air ring as claimed in claim 1, wherein the vacuum chamber forming member is provided with at least one intermediate end wall member disposed between the first said end wall member and the connection of the vacuum chamber forming member with the top member, the intermediate end wall member forming a gap with the outside wall of a tube of smaller blow-up ratio than the tube forming the corresponding gap with the first said end wall portion.

8. An air ring as claimed in claim 1, wherein at least part of the said tubular side wall portion is of transparent material in order to permit observation of the portion of the bubble wall within the chamber.

9. An air ring as claimed in claim 1, and comprising an annular intermediate member disposed between the annular bottom member and the annular top member, the intermediate member also having an opening therein of circular cross-section concentric with the tube path axis for the passage therethrough of the extruded tube in the said path;

the bottom member providing the radially inner lip of a first smaller orifice discharging a first smaller annular stream of air against the tube outer surface and in the same direction as that of the tube movement;

the intermediate member having upstream and downstream portions cooperating respectively with the bottom and top members and providing the radially outer lip of the first smaller orifice and the radially inner lip of a second larger orifice, the second larger orifice discharging a second larger annular stream of air along the outer surface of the tube and in the same direction as that of the tube movement; and the top member providing the radially outer lip of the second larger orifice.

10. An air ring as claimed in claim 9, wherein the said outwardly diverging tubular side wall portion of the chamber forming member is spaced radially the said minimum distance from the tube outer wall which is between two and twenty times the radial dimension of the said annular gap.

11. An air ring as claimed in claim 9, wherein the vacuum chamber forming member is mounted on the top member for movement parallel to the said longitudinal axis for adjustment of the radial dimension of the said annular gap.

12. An air ring as claimed in claim 9, wherein the vacuum chamber forming member has a first set of a plurality of circumferentially-shaped apertures in the said side wall portion, and a second set of a plurality of circumferentially-spaced apertures in a lower wall portion between the said side wall portion and the top member.

13. An air ring as claimed in claim 9, wherein each of the said at least one opening in the vacuum chamber forming member side wall is provided with means for adjusting the air flow therethrough for adjustment of the vacuum force in the chamber.

14. An air ring as claimed in claim 9, wherein the said end wall portion comprises an iris having an opening of adjustable diameter, the radially inner edge of the iris opening forming the said annular gap with the tube outer surface.

15. An air ring as claimed in claim 9, wherein the vacuum chamber forming member is provided with at least one intermediate end wall member disposed between the first said end wall member and the connection of the vacuum chamber forming member with the top member, the intermediate end wall member forming a gap with the outside wall of a tube of smaller blow-up ratio than the tube forming the corresponding gap with the first said end wall portion.

16. An air ring as claimed in claim 9, wherein at least part of the said tubular side wall portion is of transparent material in order to permit observation of the portion of the bubble wall within the chamber.

* * * * *